(12) United States Patent
Lu

(10) Patent No.: US 11,394,798 B2
(45) Date of Patent: Jul. 19, 2022

(54) USER PORTRAIT OBTAINING METHOD, APPARATUS, AND STORAGE MEDIUM ACCORDING TO USER BEHAVIOR LOG RECORDS ON FEATURES OF ARTICLES

(71) Applicant: TENCENT TECHNOLOGY (SHENZHEN) COMPANY LIMITED, Shenzhen (CN)

(72) Inventor: Mengping Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 312 days.

(21) Appl. No.: 16/026,420

(22) Filed: Jul. 3, 2018

(65) Prior Publication Data
US 2018/0316776 A1    Nov. 1, 2018

Related U.S. Application Data

(63) Continuation of application No. PCT/CN2017/081928, filed on Apr. 25, 2017.

(30) Foreign Application Priority Data

Apr. 29, 2016   (CN) .......................... 201610284124.6

(51) Int. Cl.
*G06F 16/9535* (2019.01)
*G06Q 50/00* (2012.01)
(Continued)

(52) U.S. Cl.
CPC ........ *H04L 67/306* (2013.01); *G06F 16/9535* (2019.01); *G06K 9/6281* (2013.01);
(Continued)

(58) Field of Classification Search
CPC . G06F 16/9535; G06F 15/76; G06K 9/00335; G06K 9/6277; G06K 9/6281;
(Continued)

(56) References Cited

U.S. PATENT DOCUMENTS 7,240,055 B2 *   7/2007   Grasso ................ G06F 16/9535
8,306,940 B2 *   11/2012  Lee ........................ G06N 20/00
                                                                 706/61

(Continued)

FOREIGN PATENT DOCUMENTS

CN         101751448 A      6/2010
CN         102722552 A      10/2012
(Continued)

OTHER PUBLICATIONS

The World Intellectual Property Organization (WIPO) International Search Report for PCT/CN2017/081928 dated Aug. 2, 2017 6 Pages (including translation).

(Continued)

*Primary Examiner* — Neveen Abel Jalil
*Assistant Examiner* — Hubert Cheung
(74) *Attorney, Agent, or Firm* — Anova Law Group, PLLC

(57) ABSTRACT

User portrait obtaining method, apparatus, and storage medium are provided. The method includes: obtaining M training samples according to a user behavior log. An initialized user parameter matrix $W_{m\times k}$ and an initialized tag parameter matrix $H_{k\times n}$ are modified according to the M training samples by using a data fitting model, to obtain a final user parameter matrix $W_{m\times k}$ and a final tag parameter matrix $H_{k\times n}$. Further, a user portrait matrix $P_{m\times n}$ is obtained according to the final user parameter matrix $W_{m\times k}$ and the final tag parameter matrix $H_{k\times n}$. In the present disclosure, a user and a tag are parameterized, and a user parameter (Continued)

matrix and a tag parameter matrix are modified by using the data fitting model, so as to fit a training sample.

18 Claims, 5 Drawing Sheets

(51) Int. Cl.
| | |
|---|---|
| *H04L 67/306* | (2022.01) |
| *G06N 5/02* | (2006.01) |
| *G06K 9/62* | (2022.01) |
| *H04L 67/50* | (2022.01) |
| *G06N 20/00* | (2019.01) |

(52) U.S. Cl.
CPC ............. *G06N 5/022* (2013.01); *G06Q 50/01* (2013.01); *H04L 67/22* (2013.01); *G06N 20/00* (2019.01)

(58) Field of Classification Search
CPC ........ G06N 5/022; G06N 20/00; G06Q 50/01; G06Q 30/0201; G06Q 30/0631; H04L 67/306; H04L 67/22
See application file for complete search history.

(56) References Cited

U.S. PATENT DOCUMENTS

| | | | | | |
|---|---|---|---|---|---|
| 8,463,295 | B1* | 6/2013 | Caralis | ................ | H04W 4/021 455/456.3 |
| 8,606,787 | B1* | 12/2013 | Asgekar | ................ | G06F 16/285 707/737 |
| 8,838,587 | B1* | 9/2014 | Adams | ................ | G06F 16/951 707/731 |
| 8,874,727 | B2* | 10/2014 | Swahar | ................ | H04L 43/08 709/224 |
| 9,026,537 | B1* | 5/2015 | Asgekar | ........... | G06F 17/30598 707/737 |
| 9,852,208 | B2* | 12/2017 | Chari | ................ | G06F 16/285 |
| 10,467,327 | B1* | 11/2019 | Arazi | ................ | G06Q 30/02 |
| 11,276,077 | B2* | 3/2022 | Gould | ................ | G06F 16/9535 |
| 2006/0200556 | A1* | 9/2006 | Brave | ................ | G06F 16/9535 709/224 |
| 2008/0235216 | A1* | 9/2008 | Ruttenberg | ........ | G06F 16/9535 707/999.005 |
| 2009/0138472 | A1* | 5/2009 | MacLean | ............ | G06F 16/951 |
| 2009/0265328 | A1* | 10/2009 | Parekh | ................ | G06F 16/951 |
| 2010/0169340 | A1* | 7/2010 | Kenedy | ................ | G06Q 30/02 707/758 |
| 2010/0169343 | A1* | 7/2010 | Kenedy | ............ | G06F 16/9535 707/758 |
| 2010/0211568 | A1* | 8/2010 | Chu | ................ | G06F 16/9535 707/732 |
| 2010/0217648 | A1* | 8/2010 | Agarwal | ............ | G06Q 30/0202 705/7.31 |
| 2011/0004578 | A1* | 1/2011 | Momma | ................ | G06N 20/00 706/12 |
| 2012/0297038 | A1* | 11/2012 | Mei | ................ | G06Q 50/01 709/223 |
| 2013/0073983 | A1* | 3/2013 | Rasmussen | ............ | G06Q 50/01 715/753 |
| 2013/0080427 | A1* | 3/2013 | Cross | ................ | G06F 16/3326 707/728 |
| 2013/0144818 | A1* | 6/2013 | Jebara | ................ | G06Q 50/02 706/12 |
| 2013/0159100 | A1* | 6/2013 | Raina | ................ | G06Q 30/0241 705/14.52 |
| 2013/0246146 | A1 | 9/2013 | Fischer et al. | | |
| 2013/0268595 | A1* | 10/2013 | Mohan | ............ | H04L 12/185 709/204 |
| 2013/0311222 | A1* | 11/2013 | Chaturvedi | ...... | G06Q 10/06398 705/7.15 |
| 2014/0156579 | A1* | 6/2014 | Bouchard | ........... | G06F 16/9535 706/46 |
| 2014/0164172 | A1* | 6/2014 | Du | ................ | G06F 16/9535 705/26.7 |
| 2014/0164401 | A1* | 6/2014 | Kyaw | ................ | G06F 16/9535 707/751 |
| 2014/0214895 | A1* | 7/2014 | Higgins | ............. | G06F 16/9535 707/770 |
| 2014/0222721 | A1* | 8/2014 | Stock | ................ | G06Q 30/0201 706/11 |
| 2015/0039609 | A1* | 2/2015 | Weinstein | ............. | G06Q 10/10 707/734 |
| 2015/0089409 | A1* | 3/2015 | Asseily | .............. | G06Q 50/01 715/765 |
| 2015/0178282 | A1* | 6/2015 | Gorur | ................ | G06F 16/9535 707/748 |
| 2015/0206183 | A1* | 7/2015 | Zhou | ................ | G06Q 50/01 705/14.53 |
| 2015/0278742 | A1* | 10/2015 | Hale | ................ | G06F 16/285 705/7.37 |
| 2015/0347905 | A1* | 12/2015 | Chen | ................ | G06Q 50/01 706/12 |
| 2015/0379609 | A1* | 12/2015 | Sedhain | ............. | G06Q 30/0631 705/26.7 |
| 2016/0019298 | A1* | 1/2016 | Brodie | ................ | G06F 16/148 707/734 |
| 2016/0191450 | A1* | 6/2016 | Lineberger | ......... | G06Q 30/0241 709/206 |
| 2016/0217141 | A1* | 7/2016 | De Vleeschauwer | ...... | H04L 67/288 |
| 2017/0124196 | A1* | 5/2017 | Gustavsson | ........... | G06F 16/285 |
| 2019/0066020 | A1* | 2/2019 | Allen | ................ | G06Q 10/06375 |

FOREIGN PATENT DOCUMENTS

| | | |
|---|---|---|
| CN | 103744966 A | 4/2014 |
| CN | 104090886 A | 10/2014 |
| CN | 104111969 A | 10/2014 |
| CN | 104750731 A | 7/2015 |

OTHER PUBLICATIONS

The State Intellectual Property Office of the People's Republic of China (SIPO) Office Action 1 for 201610284124.6 dated Dec. 25, 2018 11 Pages (including translation).

* cited by examiner

USER PORTRAIT OBTAINING METHOD, APPARATUS, AND STORAGE MEDIUM ACCORDING TO USER BEHAVIOR LOG RECORDS ON FEATURES OF ARTICLES

RELATED APPLICATIONS

This application is a continuation application of PCT Patent Application No. PCT/CN2017/081928, filed on Apr. 25, 2017, which claims priority to Chinese Patent Application No. 201610284124.6, entitled "user portrait obtaining method and apparatus" filed with the Patent Office of China on Apr. 29, 2016, all of which is incorporated by reference in their entirety.

FIELD OF THE TECHNOLOGY

The present disclosure relates to the field of information processing technologies, and in particular, to a user portrait obtaining method, apparatus, and storage medium.

BACKGROUND OF THE DISCLOSURE

A user portrait, or a user persona, is an effective tool used for delineating a target user and combining a user demand with a design direction, and is widely applied to various fields. During specific implementation, the user portrait may be represented by a tag set used for portraying user features. The tag set may include tags used for portraying the user features in terms of a social attribute, a living habit, consumption behavior, and the like of a user. The tags may include age, gender, region, education background, user preference, and other tags.

In a conventional user portrait obtaining method, multiple tags are preset, and each tag is provided with a corresponding tag weight. The tag weight may be preset according to an actual application requirement or human experience. Optionally, the tag weight corresponding to each tag may be set according to a proportion of an article having tag in all articles. Usually, the proportion has a negative correlation with the tag weight, that is, a larger proportion indicates a smaller tag weight, and a smaller proportion indicates a larger tag weight. Then, a user behavior log is obtained. Various behaviors performed by the user on various articles are recorded in the user behavior log. For example, a user 1 browses an article 1, a user 2 purchases the article 1, and the user 1 purchases an article 2. Subsequently, a behavior weight of the user to each tag is determined according to the tag of each article and behavior performed by the user on each article. Finally, a preference degree of the user for each tag is obtained through calculation according to the tag weight and the behavior weight that correspond to the tag. The preference degrees of the user for tags are integrated to obtain the user portrait. For example, the preference degree of the user for a tag may be represented by using a tag weight and a behavior weight that corresponds to the tag.

However, the corresponding tag weight needs to be manually set for each tag, and there are usually a large amount of tags. Consequently, a large amount of time and human resources have to be consumed, and time and labor costs of obtaining the user portrait are high. Moreover, when manually setting the tag weight, an error may occur. It is very difficult to ensure that a manually set tag weight satisfies an actual service. Consequently, the accuracy of the finally obtained user portrait is relatively low.

SUMMARY

To resolve the technical problems that time and labor costs are high, and the accuracy of an obtained user portrait is low in the conventional user portrait obtaining methods, embodiments of the present disclosure provide a user portrait obtaining method, apparatus, and storage medium.

According to one aspect of the embodiments of the present disclosure, a user portrait obtaining method is provided. The method includes: obtaining M training samples according to a user behavior log, where a training sample <u, i, j> is used for reflecting a difference between preference degrees of a user u for an article i and an article j, and M is a positive integer. The method further includes: modifying an initialized user parameter matrix $W_{m \times k}$ and an initialized tag parameter matrix $H_{k \times n}$ according to the M training samples by using a data fitting model, to obtain a final user parameter matrix $W_{m \times k}$ and a final tag parameter matrix $H_{k \times n}$, where m represents the number of users, k represents the number of factors, n represents the number of tags, m is a positive integer, k is a positive integer, and n is an integer greater than 1. Further, a user portrait matrix $P_{m \times n}$ is obtained according to the final user parameter matrix $W_{m \times k}$ and the final tag parameter matrix $H_{k \times n}$, where an element $P_{ut}$ in a $u^{th}$ row and a $t^{th}$ column in the user portrait matrix $P_{m \times n}$ represents a preference degree of the user u for a tag t, u is an integer greater than or equal to 1 and smaller than or equal to m, and t is an integer greater than or equal to 1 and smaller than or equal to n.

According to another aspect of the embodiments of the present disclosure, a user portrait obtaining apparatus is provided. The apparatus includes: a memory, configured to store computer-readable instructions; and one or more processors, coupled to the memory. When the computer-readable instructions are executed, the one or more processors are configured to: obtain M training samples according to a user behavior log, where a training sample <u, i, j> is used for reflecting a difference between preference degrees of a user u for an article i and an article j, and M is a positive integer. An initialized user parameter matrix $W_{m \times k}$ and an initialized tag parameter matrix $H_{k \times n}$ are modified according to the M training samples by using a data fitting model, to obtain a final user parameter matrix $W_{m \times k}$ and a final tag parameter matrix $H_{k \times n}$, where m represents the number of users, k represents the number of factors, n represents the number of tags, m is a positive integer, k is a positive integer, and n is an integer greater than 1. The one or more processors are further configured to obtain a user portrait matrix $P_{m \times n}$ according to the final user parameter matrix $W_{m \times k}$ and the final tag parameter matrix $H_{k \times n}$, an element $P_{ut}$ in a $u^{th}$ row and a $t^{th}$ column in the user portrait matrix $P_{m \times n}$ represents a preference degree of the user u for a tag t, u is an integer greater than or equal to 1 and smaller than or equal to m, and t is an integer greater than or equal to 1 and smaller than or equal to n.

According to another aspect of the embodiments of the present disclosure, a non-transitory computer-readable storage medium is provided. The storage medium contains computer-executable program instructions for one or more processor to: obtain M training samples according to a user behavior log, where a training sample <u, i, j> is used for reflecting a difference between preference degrees of a user u for an article i and an article j, and M being a positive integer. The program instructions further cause the one or more processors to modify an initialized user parameter matrix $W_{m \times k}$ and an initialized tag parameter matrix $H_{k \times n}$ according to the M training samples by using a data fitting model, to obtain a final user parameter matrix $W_{m \times k}$ and a final tag parameter matrix $H_{k \times n}$, where m represents the number of users, k represents the number of factors, n represents the number of tags, m is a positive integer, k is a positive integer, and n is an integer greater than 1 Further, a user portrait matrix $P_{m \times n}$ is obtained according to the final user parameter matrix $W_{m \times k}$ and the final tag parameter matrix $H_{k \times n}$, where an element $P_{ut}$ in a $u^{th}$ row and a $t^{th}$ column in the user portrait matrix $P_{m \times n}$ represents a preference degree of the user u for a tag t, u is an integer greater than or equal to 1 and smaller than or equal to m, and t is an integer greater than or equal to 1 and smaller than or equal to n.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
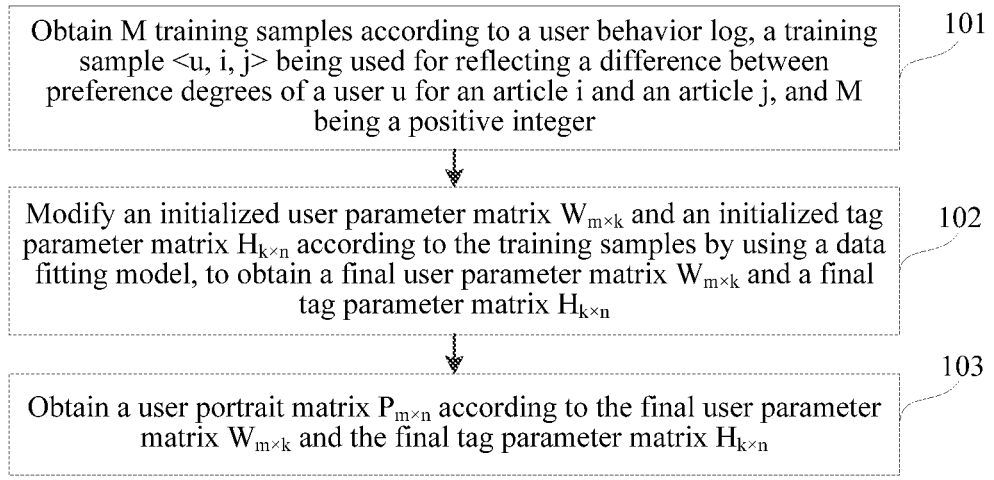
FIG. 1 is a flowchart of a user portrait obtaining method according to an exemplary embodiment of the present disclosure.

To make the objectives, technical solutions, and advantages of the present disclosure clearer, the following further describes implementations of the present disclosure in detail with reference to the accompanying drawings.

As used herein, unless otherwise specified, the term "article" includes a physical article and a virtual article. The physical article is a real article, and is an object related to work or life consumption, for example, clothes, food, or office supplies. The virtual article is an article that cannot be touched in reality, for example, videos, audio, images, application software, products or content such as microblog, or an article derived from a virtual network world, such as a game prop, membership, or an icon.

As used herein, unless otherwise specified, the term "tag" refers to a keyword used for describing an article attribute. For example, tags of clothes may include keywords described from the perspectives of color, style, size, and the like. For another example, tags of a video may include keywords described from the perspectives of year, nation, type, actors, and the like. For another example, tags of a game may include keywords described from the perspectives of classification, function, class, and the like.

As used herein, unless otherwise specified, the term "behavior type of a user" refers to behavior performed by the user on an article including, for example, browsing, purchasing, adding an article to Favorites, deleting, using, reposting, like, dislike, or commenting. For a different article, behavior performed by the user on the article may be the same or may be different. For example, for clothes, behavior performed by the user on the article may include browsing, purchasing, adding the article to Favorites, or the like. For another example, for a video, behavior performed by the user on the article may include browsing, previewing, watching, purchasing, adding the article to Favorites, or the like. For another example, for microblog, behavior performed by the user on the article may include browsing, reposting, adding the article to Favorites, or the like. Optionally, the behavior type of the user further includes an "unknown" type, used for representing that the user has not done any behavior to the article. A behavior type of a user to an article reflects a preference degree of the user for the article. A difference between preference degrees of the user for two articles may be determined according to behavior types of the user to the two articles.

In various embodiments, an application scenario of the embodiments of the present disclosure is illustrated. A user portrait may be represented by a tag set used for portraying user features. The tag set may include tags used for portraying the user features in terms of a social attribute, a living habit, consumption behavior, and the like of a user. Therefore, the user portrait may be used for representing the user features. The preference, the habit, and the like of the user may be determined by using the user features. Therefore, after the user portrait is obtained, the user portrait may be applied to various application scenarios.

For example, in an application scenario, the preference of the user may be determined according to the user portrait, to recommend some articles to the user, such as clothes, food, and electronic devices, so as to recommend different articles to different users, thereby implementing personalized recommendation, and improving the precision of article recommendation. For another example, in another application scenario, a use habit of the user to an electronic device may be determined according to the user portrait. It is assumed that a time interval at which the user needs to perform security detection on the electronic device may be determined or the user needs to erase the traces after browsing a web page, these operations are automatically performed according to the use habit of the user, and the user does not need to perform the operations manually, thereby improving user stickiness.

Certainly, in actual applications, the user portrait may be applied to another scenario. The above described two application scenarios are used as examples for description in the embodiments of the present disclosure. Other application scenarios are not listed one by one herein but may be encompassed in the present disclosure.

The method provided in the embodiments of the present disclosure may be performed by an electronic device having a data storage capability and a calculation capability, such as a server. Although the server is used as an example for illustration purposes, any suitable devices may be used to implement the disclosed methods in the present disclosure.

FIG. 1 is a flowchart of a user portrait obtaining method according to an exemplary embodiment of the present disclosure. The method may include the following exemplary steps:

Step 101. Obtaining M training samples according to a user behavior log, a training sample <u, i, j> being used for reflecting a difference between preference degrees of a user u for an article i and an article j, and M being a positive integer.

Step 102. Modifying an initialized user parameter matrix $W_{m \times k}$ and an initialized tag parameter matrix $H_{k \times n}$ according to the M training samples by using a data fitting model, to obtain a final user parameter matrix $W_{m \times k}$ and a final tag parameter matrix $H_{k \times n}$.

m represents the number of users, k represents the number of factors, n represents the number of tags, m is a positive integer, k is a positive integer, and n is an integer greater than 1.

Step 103. Obtaining a user portrait matrix $P_{m \times n}$ according to the final user parameter matrix $W_{m \times k}$ and the final tag parameter matrix $H_{k \times n}$.

An element $P_{ut}$ in a $u^{th}$ row and a $t^{th}$ column in the user portrait matrix $P_{m \times n}$ represents a preference degree of the user u for a tag t, u is an integer greater than or equal to 1 and smaller than or equal to m, and t is an integer greater than or equal to 1 and smaller than or equal to n.

As such, M training samples are obtained according to a user behavior log. An initialized user parameter matrix $W_{m \times k}$ and an initialized tag parameter matrix $H_{k \times n}$ are modified according to the training samples by using a data fitting model, to obtain a final user parameter matrix $W_{m \times k}$ and a final tag parameter matrix $H_{k \times n}$. Then, a user portrait matrix $P_{m \times n}$ is obtained according to the final user parameter matrix $W_{m \times k}$ and the final tag parameter matrix $H_{k \times n}$. Therefore, the technical problems in a conventional method that the time and labor costs are high and the accuracy of the obtained user portrait is low are resolved. A user and a tag are parameterized, and a user parameter matrix and a tag parameter matrix are modified by using the data fitting model, so as to fit a training sample. Therefore, a corresponding tag weight does not need to be manually set for the tag. A user portrait is automatically obtained according to the user behavior log by using a data fitting method, thereby implementing the technical improvements of reducing the time and labor costs and accurately and highly-efficiently obtaining the user portrait.

Figure 2:
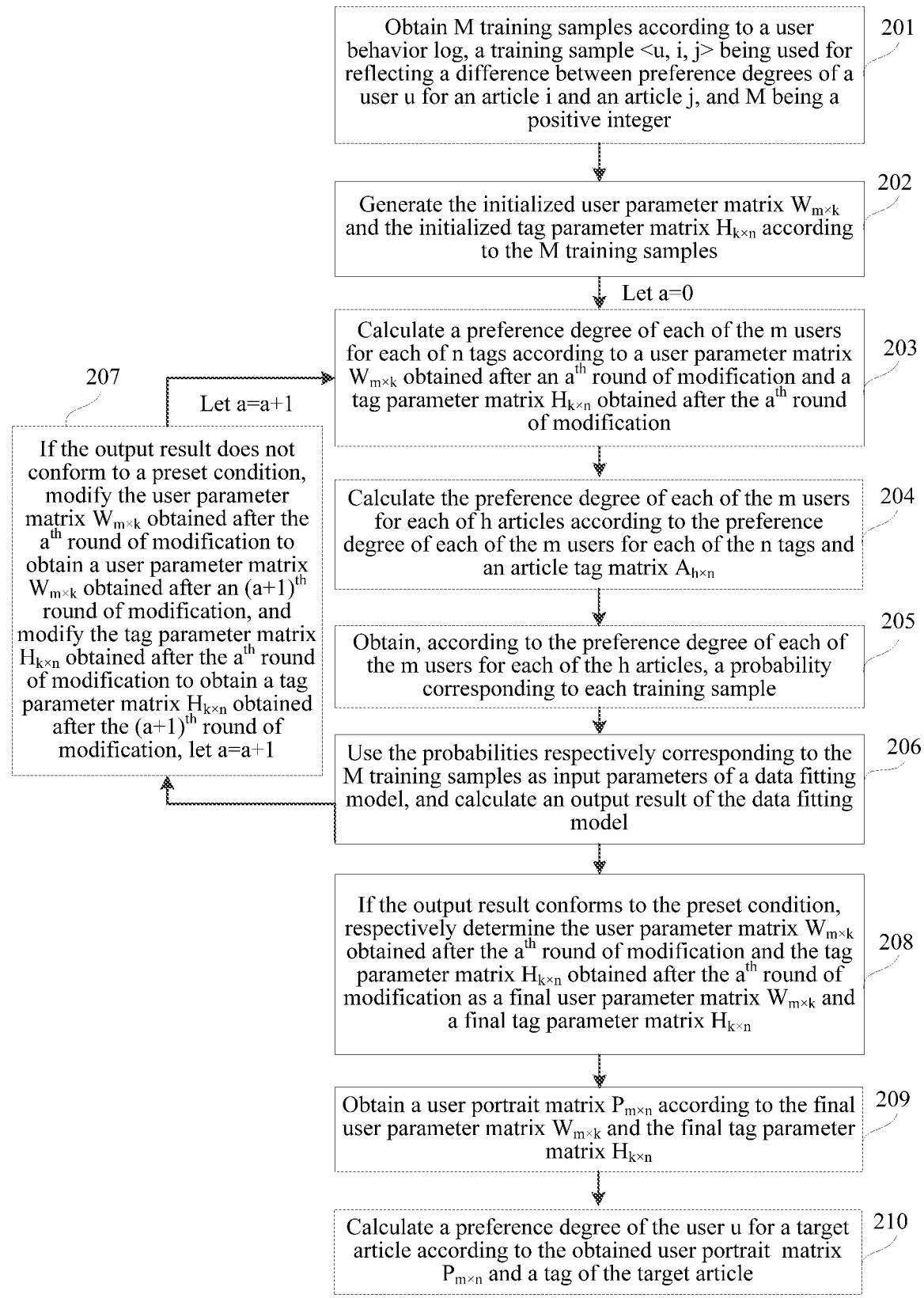
FIG. 2 is a flowchart of a user portrait obtaining method according to another exemplary embodiment of the present disclosure.

FIG. 2 is a flowchart of a user portrait obtaining method according to another exemplary embodiment of the present disclosure. In various embodiments, for illustration purposes, a server is used as an example for implementing the disclosed methods, although any suitable devices may be used to implement the methods disclosed herein. The method may include the following exemplary steps.

Step 201. Obtaining M training samples according to a user behavior log.

The training sample may be represented by <u, i, j>, the training sample <u, i, j> is used for reflecting a difference between preference degrees of a user u for an article i and an article j, and M is a positive integer.

The user behavior log is used for recording operation behavior performed by a user on an article. The user behavior log includes a user identifier, a behavior type of the user, an article identifier, and article tag information. The user identifier is an identification number used for identifying a user identity, is also referred to as a user account, and is a relatively unique code in a system. The behavior type of the user is behavior performed by the user on an article, for example, browsing, purchasing, adding the article to Favorites, deleting, using, reposting, like, dislike, commenting, or unknown. The behavior type of the user may be set according to an actual application requirement. The article identifier is an identification number used for identifying an article. Similar to the user identifier, each article corresponds to a unique article identifier. The article tag information is a keyword used for describing an article attribute. One article may include one or more tags. A manner for obtaining the user behavior log may be that the server collects operation behavior on a terminal, or a terminal actively reports operation behavior performed by the user to the server.

The training sample <u, i, j> is used for reflecting the difference between the preference degrees of the user u for the article i and the article j. In an exemplary implementation, the training sample <u, i, j> is used for reflecting that the preference degree of the user u for the article i is greater than the preference degree for the article j. In another possible implementation, the training sample <u, i, j> is used for reflecting that the preference degree of the user u for the article i is less than the preference degree for the article j. A behavior type of a user to an article reflects a preference degree of the user for the article. A difference between preference degrees of the user for two articles may be determined according to behavior types of the user to the two articles.

Optionally, a weight rule of the behavior type is determined according to costs paid by the user, a relative size relationship between all behavior types is determined according to weights of the behavior types. For example, a weight of the behavior type "purchasing" is greater than a weight of the behavior type "browsing". When the user has not done any behavior to the article, it is obtained that the behavior type of the user is the "unknown" type. For example, a preference degree of the user for an article on which the user performs behavior is greater than a preference degree for an article to which the user has not done any behavior. Therefore, the weight of the behavior type "unknown" is the smallest, and is less than weights of the behavior types "browsing", "purchasing", and the like. For example, when the user u performs behavior on the article i, and performs no behavior on the article j, the preference degree of the user u for the article i is greater than the preference degree for the article j.

For example, an example in which the training sample <u, i, j> is used for reflecting that the preference degree of the user u for the article i is greater than the preference degree for the article j is used. When the preference degree of the user u for the article i is greater than the preference degree for the article j, an obtained training sample is <u, i, j>. On the contrary, an obtained training sample is <u, j, i>. For example, when the user u purchases the article i and browses the article j, the obtained training sample is <u, i, j>; and when the user browses the article i and purchases the article j, the obtained training sample is <u, j, i>. For another example, the user browses the article i, but has not performed any behavior on the article j, the obtained training sample is <u, i, j>. One or more training samples may be obtained for one user. When a user 1 browses an article 2, but has not performed any behavior on an article 1, an article 3, and an article 4, the obtained training samples include <1, 2, 1>, <1, 2, 3>, and <1, 2, 4>.

Figure 3:
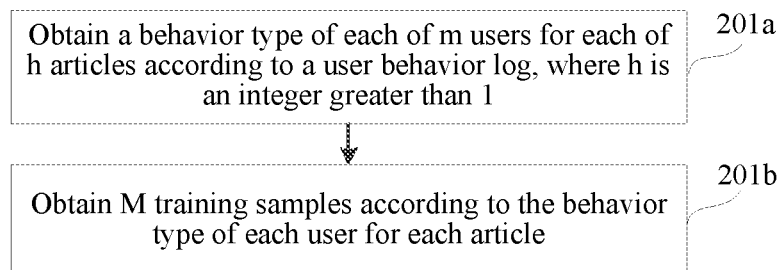
FIG. 3 is a flowchart for obtaining M training samples according to a user behavior log according to the user portrait obtaining method in FIG. 2.

In an exemplary implementation, as shown in FIG. 3, obtaining M training samples according to a user behavior log in the exemplary step 201 may include the following exemplary steps.

Step 201a. Obtaining a behavior type of each of m users for each of h articles according to the user behavior log.

m represents the number of users, h represents the number of articles, m is a positive integer, and h is an integer greater than 1.

Step 201b. Obtaining the M training samples according to the behavior type of each user for each article.

In an exemplary implementation, obtaining the M training samples according to the behavior type of each user for each article in the exemplary step 201b may include:

1. Obtaining a user article matrix according to the behavior type of the user.

Optionally, the user article matrix may be represented by $R_{m \times h}$, a row of the user article matrix $R_{m \times h}$ represents the user, a column represents the article, m represents the number of users, h represents the number of articles, and an element $R_{ui}$ represents whether the user u has performed behavior on the article i. Exemplarily, elements in the user article matrix $R_{m \times h}$ are represented by 0 or 1. 1 represents that the user performs behavior on the article, and 0 represents that the user has not performed any behavior on the article. Exemplarily, when the number of users is 3, and the number of articles is 4, the user article matrix $R_{m \times h}$ is:

$$R = \begin{pmatrix} 0 & 1 & 0 & 0 \\ 0 & 0 & 1 & 0 \\ 0 & 1 & 0 & 1 \end{pmatrix}, m = 3, h = 4$$

where 1 in the first row and the second column represents that the user 1 performs behavior on the article 2.

2. Obtaining the M training samples according to the behavior type of the user and the user article matrix.

It may be learned, according to the user article matrix, whether the user performs behavior on the article. For the user u, it may be determined, according to the behavior type, whether the preference degree of the user u for the article i is greater than the preference degree for the article j, to obtain a training sample. Exemplarily, as can be known from the first row of the user article matrix $R_{3 \times 4}$, the user 1 performs behavior on the article 2, and has not performed any behavior on the article 1, the article 3, and the article 4. An example in which the training sample <u, i, j> is used for reflecting that the preference degree of the user u for the article i is greater than the preference degree for the article j, and the obtained training sample of the user 1 includes <1, 2, 1>, <1, 2, 3>, and <1, 2, 4>.

It should be noted that, a preference degree of the user for an article on which the user performs behavior is greater than a preference degree for an article on which the user has not performed any behavior. However, in another possible case, a preference degree of the user for an article on which the user performs behavior may be less than a preference degree for an article on which the user has not performed any behavior. An example in which the article is a video is used. When behavior performed by the user on a video A is dislike, and the user has not performed any behavior on a video B, it is considered that a preference degree of the user for the video A is less than a preference degree for the video B.

In addition, the number of users is m, and the number of articles is h. Therefore, $$\frac{m \times h \times (h-1)}{2}$$

samples may be theoretically constructed. During actual operation, some relatively reliable samples are selected from the $$\frac{m \times h \times (h-1)}{2}$$

samples by means of sampling, to serve as training samples. For example, when the user u has not performed any behavior on the article i or the article j, or the behavior types of the user u to the article i and the article j are the same, the difference between the preference degrees of the user u for the article i and the article j cannot be determined. Such a sample is not used as a training sample. For another example, an execution possibility of each article is obtained. An execution possibility of an article is a possibility that the user performs behavior on the article. The execution possibility may be determined based on factors such an appearance rate, a popularity degree, a recommendation degree, and a display rank of the article in an entire system. For example, a larger appearance rate of the article in the entire system indicates that it is very easy for the user to obtain the article, and indicates a larger execution possibility of the article. On the contrary, a smaller appearance rate of the article in the entire system indicates that it is relatively difficult for the user to obtain the article, and indicates a smaller execution possibility of the article. When the training sample is obtained, when an article on which the user u performs behavior and an article on which the user u has not performed any behavior are selected to construct the training sample, an article having a larger execution possibility is selected from the articles on which the user u has not performed any behavior, to construct the training sample. As such, it may be ensured that the obtained training sample more accurately reflects a difference between preference degrees of the user for two articles, thereby reducing an error risk of the training sample, and improving reliability of the training sample.

Step 202. Generating the initialized user parameter matrix $W_{m \times k}$ and the initialized tag parameter matrix $H_{k \times n}$.

m represents the number of users, k represents the number of factors, n represents the number of tags, m is a positive integer, k is a positive integer, and n is an integer greater than 1. In an exemplary implementation, the initialized user parameter matrix $W_{m \times k}$ and the initialized tag parameter matrix $H_{k \times n}$ are constructed in a manner for generating a normally distributed random number. That is, elements in the initialized user parameter matrix $W_{m \times k}$ are normally distributed random numbers, and elements in the initialized tag parameter matrix $H_{k \times n}$ are normally distributed random numbers.

Optionally, the number of factors k is a preset value, or the number of factors k is an empirical value that is obtained according to a large amount of experiments.

Optionally, a normally distributed average value is set to 0, and a square is set to 0.01.

Exemplarily, a user parameter matrix $W_{m \times k}$ and a tag parameter matrix $H_{k \times n}$ that are randomly generated are as follows:

$$W = \begin{pmatrix} 0.02 & 0.12 \\ 0.13 & 0.03 \\ 0.09 & 0.11 \end{pmatrix},$$

$$H = \begin{pmatrix} 0.07 & 0.0 & 0.01 & 0.1 & 0.07 \\ 0.01 & 0.0 & 0.08 & 0.11 & 0.0 \end{pmatrix},$$

$$m = 3, k = 2, n = 5$$

where each row in the user parameter matrix $W_{m \times k}$ corresponds to a factor vector of a user, and each column in the tag parameter matrix $H_{k \times n}$ corresponds to a factor vector of a tag.

the initialized user parameter matrix $W_{m\times k}$ and the initialized tag parameter matrix $H_{k\times n}$ are modified below by means of step 203 to step 207. First, it is let that a=0, and the following step 203 is performed.

Step 203. Calculating a preference degree of each of the m users for each of n tags according to a user parameter matrix $W_{m\times k}$ obtained after an $a^{th}$ round of modification and a tag parameter matrix $H_{k\times n}$ obtained after the $a^{th}$ round of modification.

where a is an integer greater than or equal to 0, a user parameter matrix $W_{m\times k}$ obtained after the 0th round of modification is the initialized user parameter matrix $W_{m\times k}$, and a tag parameter matrix $H_{k\times n}$ obtained after the 0th round of modification is the initialized tag parameter matrix $H_{k\times n}$.

When a=0, a preference degree of each of the m users for each of the n tags is calculated according to the initialized user parameter matrix $W_{m\times k}$ and the initialized tag parameter matrix $H_{k\times n}$.

Optionally, a formula used by the user u for calculating the preference degree for the tag t is as follows:

$$\hat{p}_{ut} = \sum_{f=1}^{k} W_{uf} H_{ft}$$

For example, in the above exemplary initialized user parameter matrix W and initialized tag parameter matrix H, a preference degree of the user 1 for a tag 1 is:

$$\hat{p}_{11} = (0.02 \quad 0.12)\begin{pmatrix} 0.07 \\ 0.01 \end{pmatrix} = 0.0026,$$

and a preference degree of the user 3 for a tag 5 is:

$$\hat{p}_{35} = (0.09 \quad 0.11)\begin{pmatrix} 0.07 \\ 0.0 \end{pmatrix} = 0.0063.$$

Step 204. Calculating the preference degree of each of them users for each of the h articles according to the preference degree of each of the m users for each of the n tags and an article tag matrix $A_{h\times n}$.

The preference degree of each of the m users for each of the h articles is calculated with reference to the article tag matrix $A_{h\times n}$ after the preference degree of each user for each tag is calculated according to the initialized user parameter matrix $W_{m\times k}$ and the initialized tag parameter matrix $H_{k\times n}$.

The article tag matrix $A_{h\times n}$ is a matrix that is obtained according to an article identifier and an article tag that are carried in the user behavior log.

Optionally, a row of the article tag matrix $A_{h\times n}$ represents an article, and a column thereof represents a tag. Exemplarily, elements in the article tag matrix $A_{h\times n}$ are represented by 0 or 1. 0 represents that the article does not have an attribute described by the tag, and 1 represents that the article has the attribute described by the tag. It is assumed that the number of articles is 4 and the number of tags is 5, and an exemplary article tag matrix $A_{h\times n}$ is:

$$A = \begin{pmatrix} 1 & 1 & 0 & 0 & 0 \\ 0 & 0 & 1 & 1 & 0 \\ 1 & 0 & 0 & 0 & 1 \\ 0 & 0 & 1 & 0 & 0 \end{pmatrix}, h = 4, n = 5$$

where an article tag matrix $A_1$ represents a first row of the article tag matrix, and it indicates that the article 1 has attributes described by a tag 1 and a tag 2 and the article 1 does not have attributes described by a tag 3, a tag 4, and a tag 5.

The user likes an article usually because this article has a tag that the user prefers (that is, an attribute described by the tag). Preference of the user for the article may be viewed as a synthesis of preference degrees of the user for tags of the article. The preference degree of the user u for the article i may be calculated according to preference degrees of the user u for tags of the article i.

Optionally, in this embodiment of the present disclosure, the preference degrees of the user u for the tags of the article i are summed to calculate the preference degree of the user u for the article i. The calculate formula is:

$$\hat{y}_{ui} = \sum_{l=1}^{n} \hat{p}_{ul} \cdot A_{il}.$$

For example, in the above exemplary user parameter matrix $W_{m\times k}$ and tag parameter matrix $H_{k\times n}$, a preference degree of the user 1 for an article 1 is: $\hat{y}_{11}=\hat{p}_{11}+\hat{p}_{12}=0.0026+0=0.0026$, and a preference degree of the user 3 for an article 2 is: $\hat{y}_{32}=\hat{p}_{33}+\hat{p}_{34}=0.0097+0.0211=0.0308$.

Step 205. Obtaining, according to the preference degree of each of the m users for each of the h articles, a probability corresponding to each training sample.

The probability corresponding to the training sample <u, i, j> is a probability that the preference degree of the user u for the article i is greater than the preference degree for the article j.

Optionally, a process of calculating the probability that the preference degree of the user u for the article i is greater than the preference degree for the article j is as follows:

In a first exemplary step, a difference between the preference degree of the user u for the article i and the preference degree of the user u for the article j is calculated according to the calculated preference degree of each user for each article: $\hat{x}_{uij}=\hat{y}_{ui}-\hat{y}_{uj}$.

In a second exemplary step, the probability that the preference degree of the user u for the article i is greater than the preference degree for the article j is calculated according to a logistic function $\sigma(x)$:

$$\sigma(\hat{x}_{uij}) = \frac{1}{1+e^{-\hat{x}_{uij}}}.$$

Step 206. Using the probabilities respectively corresponding to the M training samples as input parameters of the data fitting model, and calculate an output result of the data fitting model.

Optionally, the data fitting model is a model that is constructed by using a Bayesian maximum fitting estimation method. The specific data fitting model is as follows:

$$\sum_{(u,i,j)\in D_S}\left(\ln\sigma(\hat{x}_{uij}) - \frac{\lambda_W}{2}\|W_u\|^2 - \frac{\lambda_H}{2}\|H\|^2 - \frac{\lambda_S}{2}\left\|W_u - \sum_{v\in N_u} S_{uv}W_v\right\|^2\right)$$

where $\lambda_W$, $\lambda_H$, and $\lambda_S$ are regularization parameters used for preventing over fitting, $\lambda_W$, $\lambda_H$, and $\lambda_S$ are positive real numbers, $\|\bullet\|$ represents a 2-norm of a matrix, $D_s$ represents a set of the M training samples, a probability corresponding to the training sample <u, i, j> is $$\sigma(\hat{x}_{uij}) = \frac{1}{1+e^{-\hat{x}_{uij}}},$$

$\hat{x}_{uij}$ represents a difference between the preference degree of the user u for the article i and the preference degree of the user u for the article j, $\sigma(x)$ represents a logistic function, $N_u$ represents a set of associated users of the user u, $S_{uv}$ is an element in a $u^{th}$ row and a $v^{th}$ column in a user similarity matrix $S_{m\times m}$, $S_{uv}$ represents a similarity between the user u and a user v, $W_u$, represents a row vector corresponding to a $u^{th}$ row in the user parameter matrix $W_{m\times k}$ obtained after the $a^{th}$ round of modification, and $W_v$ represents a row vector corresponding to a $v^{th}$ row in the user parameter matrix $W_{m\times k}$ obtained after the $a^{th}$ round of modification.

$N_u$ represents the set of associated users of the user u, that is, represents a set of other users having an association relationship with the user u. The association relationship may be friendship. For example, when a user v and the user u are friends in a social application, the user u and the user v has friendship, and the user u and the user v are associated users. Alternatively, the association relationship may be non-friendship. For example, when a user v and the user u belong to a same group in a social application, the user u and the user v are associated users. It should be noted that when the user similarity matrix $S_{m\times m}$ is constructed, any two users in the user similarity matrix $S_{m\times m}$ may be users that have friendship, or may be users that do not have friendship (for example, belong to a same group, or even may be strangers that do not know each other).

The user similarity matrix $S_{m\times m}$ includes a similarity between every two users of the m users. Optionally, a diagonal element of a matrix S is set to $S_{uu}=0$, and finally, normalization is performed according to rows, so that $$\sum_{v=1}^{m} S_{uv} = 1.$$

Step 207. When the output result dissatisfies the preset condition, modifying the user parameter matrix $W_{m\times k}$ obtained after the $a^{th}$ round of modification to obtain a user parameter matrix $W_{m\times k}$ obtained after an $(a+1)^{th}$ round of modification, modifying the tag parameter matrix $H_{k\times n}$ obtained after the $a^{th}$ round of modification to obtain a tag parameter matrix $H_{k\times n}$ obtained after the $(a+1)^{th}$ round of modification, letting a=a+1, and returning to perform the exemplary step 203 to step 206.

The preset condition includes that a difference between an output result of a current round and an output result of a previous round is less than a preset threshold, and/or modification on the user parameter matrix and the tag parameter matrix reaches the preset number of rounds. The preset threshold and the preset number of rounds are set after modification precision and modification efficiency are measured.

Optionally, the user parameter matrix $W_{m\times k}$ obtained after the $(a+1)^{th}$ round of modification is obtained according to the user parameter matrix $W_{m\times k}$ obtained after the $a^{th}$ round of modification by using the following formula:

$$W_u' \leftarrow W_u + \alpha\left(\frac{e^{-\hat{x}_{uij}}}{1+e^{-\hat{x}_{uij}}}\sum_{l=1}^{n} H_{\bullet l}^T(A_{il} - A_{jl}) - \lambda_W W_u - \right.$$
$$\left. \lambda_S\left(W_u - \sum_{v\in N_u} S_{uv}W_v\right) + \lambda_S \sum_{[v|u\in N_v]} S_{vu}\left(W_v - \sum_{w\in N_v} S_{vw}W_w\right)\right)$$

where $W_u'$ represents a row vector corresponding to a $u^{th}$ row in the user parameter matrix $W_{m\times k}$ obtained after the $(a+1)^{th}$ round of modification, $W_u$ represents the row vector corresponding to the $u^{th}$ row in the user parameter matrix $W_{m\times k}$ obtained after the $a^{th}$ round of modification, $H_{\bullet l}^T$ represents a transpose vector of a column vector corresponding to an $l^{th}$ column in the tag parameter matrix $H_{k\times n}$ obtained after the $a^{th}$ round of modification, l is an integer greater than or equal to 1 and less than or equal to n, $\alpha$ is learning efficiency, $\alpha$ is a positive real number, $\alpha$ is a preset empirical value, and a may be set after a modification speed and the modification precision are measured.

Optionally, the tag parameter matrix $H_{k\times n}$ obtained after the $(a+1)^{th}$ round of modification is obtained according to the tag parameter matrix $H_{k\times n}$ obtained after the $a^{th}$ round of modification by using the following formula:

$$H_f' = H_f + \alpha\left(\frac{e^{-\hat{x}_{uij}}}{1+e^{-\hat{x}_{uij}}}W_{uf}(A_i - A_j) - \lambda_H H_f\right)$$

where $H_f'$ represents a row vector corresponding to an $f^{th}$ row in the tag parameter matrix $H_{k\times n}$ obtained after the $(a+1)^{th}$ round of modification, $H_f$ represents a row vector corresponding to an $f^{th}$ row in the tag parameter matrix $H_{k\times n}$ obtained after the $a^{th}$ round of modification, f is an integer greater than or equal to 1 and less than or equal to k, $\alpha$ is learning efficiency, $\alpha$ is a positive real number, $\alpha$ is a preset empirical value, and $\alpha$ may be set after a modification speed and the modification precision are measured.

During each round of modification, $\hat{x}_{uij}$ corresponding to each of the M training samples is substituted into the above-described formula, to modify the user parameter matrix and the tag parameter matrix for M times.

That is, during the $a^{th}$ round of modification on the user parameter matrix and the tag parameter matrix, it is let that x=1, and $\hat{x}_{uij}$ corresponding to an $x^{th}$ training sample, a user parameter matrix obtained after $(x-1)^{th}$ modification, and a tag parameter matrix obtained after the $(x-1)^{th}$ modification are substituted into the above described modification formula of the user parameter matrix, to obtain through calculation a user parameter matrix obtained after $x^{th}$ modification. $\hat{x}_{uij}$ corresponding to the $x^{th}$ training sample, the tag parameter matrix obtained after the $(x-1)^{th}$ modification, and the user parameter matrix obtained after the $x^{th}$ modification are substituted into the modification formula of the tag parameter matrix, to obtain through calculation a tag parameter matrix obtained after the $x^{th}$ modification. It is let that x=x+1, and it is detected that whether x is greater than M. When x is not greater than M, the step of substituting $\hat{x}_{uij}$ corresponding to an $x^{th}$ training sample, the user parameter matrix obtained after the $(x-1)^{th}$ modification, and the tag parameter matrix obtained after the $(x-1)^{th}$ modification into the modification formula of the user parameter matrix, to obtain through calculation the user parameter matrix obtained after the $x^{th}$ modification is re-performed. When x is greater than M, the procedure ends, and the $a^{th}$ round of modification is completed. A user parameter matrix $W_{m \times k}$ obtained after $0^{th}$ modification is a user parameter matrix obtained after an $(a-1)^{th}$ round of modification. A user parameter matrix obtained after the $0^{th}$ round of modification is the initialized user parameter matrix. A user parameter matrix obtained after $M^{th}$ modification in the $a^{th}$ round of modification is the user parameter matrix obtained after the $a^{th}$ round of modification. A tag parameter matrix obtained after the $0^{th}$ modification is a tag parameter matrix obtained after the $(a-1)^{th}$ round of modification. A tag parameter matrix obtained after the $0^{th}$ round of modification is the initialized tag parameter matrix. A tag parameter matrix obtained after the $M^{th}$ modification in the $a^{th}$ round of modification is the tag parameter matrix obtained after the $a^{th}$ round of modification.

Step 208. When the output result satisfies the preset condition, respectively determining the user parameter matrix $W_{m \times k}$ obtained after the $a^{th}$ round of modification and the tag parameter matrix $H_{k \times n}$ obtained after the $a^{th}$ round of modification as the final user parameter matrix $W_{m \times k}$ and the final tag parameter matrix $H_{k \times n}$.

When the output result of the data fitting model satisfies the preset condition, modification on the user parameter matrix $W_{m \times k}$ and the tag parameter matrix $H_{k \times n}$ is stopped, and the current user parameter matrix $W_{m \times k}$ is determined as the final user parameter matrix $W_{m \times k}$ and the current tag parameter matrix $H_{k \times n}$ is determined as the final tag parameter matrix $H_{k \times n}$.

Step 209. Obtaining a user portrait matrix $P_{m \times n}$ according to the final user parameter matrix $W_{m \times k}$ and the final tag parameter matrix $H_{k \times n}$.

An element $P_{ut}$ in a $u^{th}$ row and a $t^{th}$ column in the user portrait matrix $P_{m \times n}$ represents a preference degree of the user u for a tag t, u is an integer greater than or equal to 1 and smaller than or equal to m, and t is an integer greater than or equal to 1 and smaller than or equal to n.

The final user parameter matrix and the final tag parameter matrix are obtained after the user parameter matrix and the tag parameter matrix are repeatedly modified. A preference degree of a user for a tag is output according to the final user parameter matrix and the final tag parameter matrix.

Exemplarily, it is assumed that training samples are fitted to obtain that the final user parameter matrix and the final tag parameter matrix are $$W = \begin{pmatrix} 1.2 & 0.2 \\ 0.3 & 1.3 \\ 1.1 & 0.9 \end{pmatrix}, H = \begin{pmatrix} 0.1 & 0.0 & 0.8 & 1.1 & 0.0 \\ 0.7 & 0.0 & 0.1 & 1.0 & 0.7 \end{pmatrix},$$

where m=3, k=2, and n=5, and the user portrait matrix obtained through calculation is:

$$P = W \cdot H = \begin{pmatrix} 0.26 & 0.0 & 0.98 & 1.52 & 0.14 \\ 0.94 & 0.0 & 0.37 & 1.63 & 0.91 \\ 0.74 & 0.0 & 0.97 & 2.11 & 0.63 \end{pmatrix}.$$

Optionally, the method provided in this embodiment further includes the following step 210:

Step 210. Calculating a preference degree of the user u for a target article according to the obtained user portrait matrix $P_{m \times n}$ and tags of the target article.

Optionally, preference degrees of the user u for the tags of the target article are summed, to calculate the preference degree of the user u for the target article.

In conclusion, in the method provided in this embodiment, M training samples are obtained according to a user behavior log. An initialized user parameter matrix $W_{m \times k}$ and an initialized tag parameter matrix $H_{k \times n}$ are modified according to the M training samples by using a data fitting model, to obtain a final user parameter matrix $W_{m \times k}$ and a final tag parameter matrix $H_{k \times n}$. Then, a user portrait matrix $P_{m \times n}$ is obtained according to the final user parameter matrix $W_{m \times k}$ and the final tag parameter matrix $H_{k \times n}$.

Therefore, the technical problems in a conventional method that the time and labor costs are high and the accuracy of the obtained user portrait is low are resolved. A user and a tag are parameterized, and a user parameter matrix and a tag parameter matrix are modified by using the data fitting model, so as to fit a training sample. Therefore, a corresponding tag weight does not need to be manually set for the tag. A user portrait is automatically obtained according to the user behavior log by using a data fitting method, thereby implementing the technical improvements of reducing the time and labor costs and accurately and highly-efficiently obtaining the user portrait.

In addition, the user parameter matrix and the tag parameter matrix are modified in a manner of machine learning, so as to fit the training samples, and further automatically obtain the user portrait more accurately and highly-efficiently.

In addition, based on the idea that "Birds of a feather gather together", preference of two users having a higher similarity is more similar. The user similarity matrix is added to the data fitting model to serve as a constraint condition instead of obtaining the user portrait only by relying on the user behavior log. Moreover, the user similarity matrix is considered during modification on the user parameter matrix. This reflects a strong correlation between a user parameter vector and a user parameter vector of an associated user, thereby more accurately obtaining the user portrait.

Figure 4:
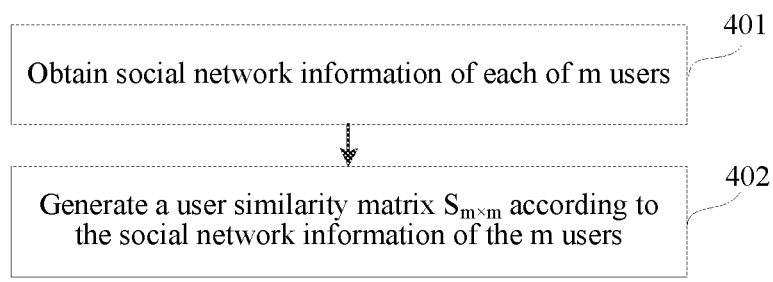
FIG. 4 is a flowchart for generating a user similarity matrix according to an exemplary embodiment of the present disclosure.

Optionally, as shown in FIG. 4, the user similarity matrix $S_{m \times m}$ is obtained in the following exemplary steps.

Step 401. Obtaining social network information of each of the m users.

The social network information includes a user identifier, a list of associated users of the user, and a similarity between the user and associated users.

The user identifier is an identification number used for identifying a user identity, is also referred to as a user account, and is a relatively unique code in a system. The list of associated users of the user includes associated users of the user, that is, other users having an association relationship with the user. The similarity between the user and the associated user is a correlation between the user and the associated user. The similarity between the user and the associated user may be determined according to one or more of the following parameters: communication frequency between the user and the associated user, whether the user and the associated user are friends, whether the user and the associated user have a same social circle, whether the user and the associated user have a same human attribute, whether the user and the associated user has same preference, and the like.

Step 402. Generating the user similarity matrix $S_{m \times m}$ according to the social network information of the m users.

A similarity between every two users is obtained according to the social network information of the m users, to generate the user similarity matrix $S_{m \times m}$. A row and a column in the user similarity matrix $S_{m \times m}$ both represent users. For example, the second row and the third column in the user similarity matrix $S_{m \times m}$ represent a similarity between a user 2 and a user 3.

Exemplarily, when the number of users is 3, the user similarity matrix $S_{m \times m}$ is:

$$S = \begin{pmatrix} 0 & 0.6 & 0.4 \\ 0.6 & 0 & 0.4 \\ 0.4 & 0.6 & 0 \end{pmatrix}, m = 3$$

0.6 in the first row represents a similarity between a user 1 and the user 2, 0.4 represents a similarity between the user 1 and the user 3, and the like. When the user similarity matrix $S_{m \times m}$ is generated, only the similarity between the user and the associated user is considered, and a similarity between the user and the user himself or herself is not considered. Therefore, the diagonal element $S_{uu}$ of the user similarity matrix $S_{m \times m}$ is set to 0.

In this manner, a user similarity matrix is introduced to serve as a constraint condition of a data fitting model and also serve as a parameter for modifying a user parameter matrix, thereby further improving accuracy of the finally obtained user portrait. In addition, only a similarity between users is used as a constraint condition to merge into the data fitting model, to reflect a strong correlation between a user parameter and a user parameter vector of an associated user. In other possible embodiments, alternatively, other data may be used as a constraint condition to merge into the data fitting model according to requirements. For example, a similarity between tags is used as a constraint condition to merge into the data fitting model, so as to construct a tag similarity matrix. A row and a column in the tag similarity matrix both represent tags. Each element represents a similarity between two tags represented by a corresponding row and column. The similarity between tags may be determined according to a similarity degree between meanings represented by the tags. For example, two tags having closer meanings have a higher similarity, to reflect a strong correlation between a tag parameter vector and a tag parameter vector of a similar tag. Therefore, the disclosed data fitting model is a relatively general frame that automatically learns the user parameter vector and the tag parameter vector to obtain a preference degree of a user for a tag, and other data may be added to the model according to requirements.

Figure 5:
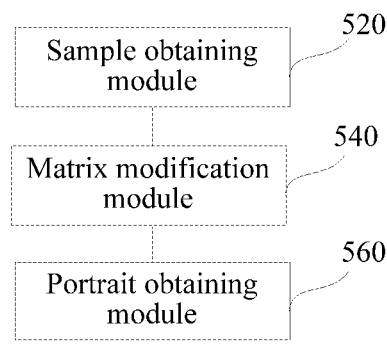
FIG. 5 is a structural block diagram of a user portrait obtaining apparatus according to an exemplary embodiment of the present disclosure.

FIG. 5 is a structural block diagram of a user portrait obtaining apparatus according to an exemplary embodiment of the present disclosure. The apparatus may be implemented by using software, hardware or a combination of the two to become a part or all of a server. The apparatus may include: a sample obtaining module 520, a matrix modification module 540, and a portrait obtaining module 560.

The sample obtaining module 520 is configured to obtain M training samples according to a user behavior log, a training sample <u, i, j> being used for reflecting a difference between preference degrees of a user u for an article i and an article j, and M being a positive integer.

The matrix modification module 540 is configured to modify, by using a data fitting model, an initialized user parameter matrix $W_{m \times k}$ and an initialized tag parameter matrix $H_{k \times n}$ according to the training samples obtained by the sample obtaining module 520, to obtain a final user parameter matrix $W_{m \times k}$ and a final tag parameter matrix $H_{k \times n}$, m representing the number of users, k representing the number of factors, n representing the number of tags, m being a positive integer, k being a positive integer, and n being an integer greater than 1.

The portrait obtaining module 560 is configured to obtain a user portrait matrix $P_{m \times n}$ according to the final user parameter matrix $W_{m \times k}$ and the final tag parameter matrix $H_{k \times n}$ that are obtained by the matrix modification module 540, an element $P_{ut}$ in a $u^{th}$ row and a $t^{th}$ column in the user portrait matrix $P_{m \times n}$ representing a preference degree of the user u for a tag t, u being an integer greater than or equal to 1 and smaller than or equal to m, and t being an integer greater than or equal to 1 and smaller than or equal to n.

In this manner, by using the apparatus provided in this embodiment, M training samples are obtained according to a user behavior log. An initialized user parameter matrix $W_{m \times k}$ and an initialized tag parameter matrix $H_{k \times n}$ are modified according to the M training samples by using a data fitting model, to obtain a final user parameter matrix $W_{m \times k}$ and a final tag parameter matrix $H_{k \times n}$. Then, a user portrait matrix $P_{m \times n}$ is obtained according to the final user parameter matrix $W_{m \times k}$ and the final tag parameter matrix $H_{k \times n}$. Therefore, the technical problems in a conventional method that the time and labor costs are high and the accuracy of the obtained user portrait is low are resolved. A user and a tag are parameterized, and a user parameter matrix and a tag parameter matrix are modified by using the data fitting model, so as to fit a training sample. Therefore, a corresponding tag weight does not need to be manually set for the tag. A user portrait is automatically obtained according to the user behavior log by using a data fitting method, thereby implementing the technical improvements of reducing the time and labor costs and accurately and highly-efficiently obtaining the user portrait.

Figure 6:
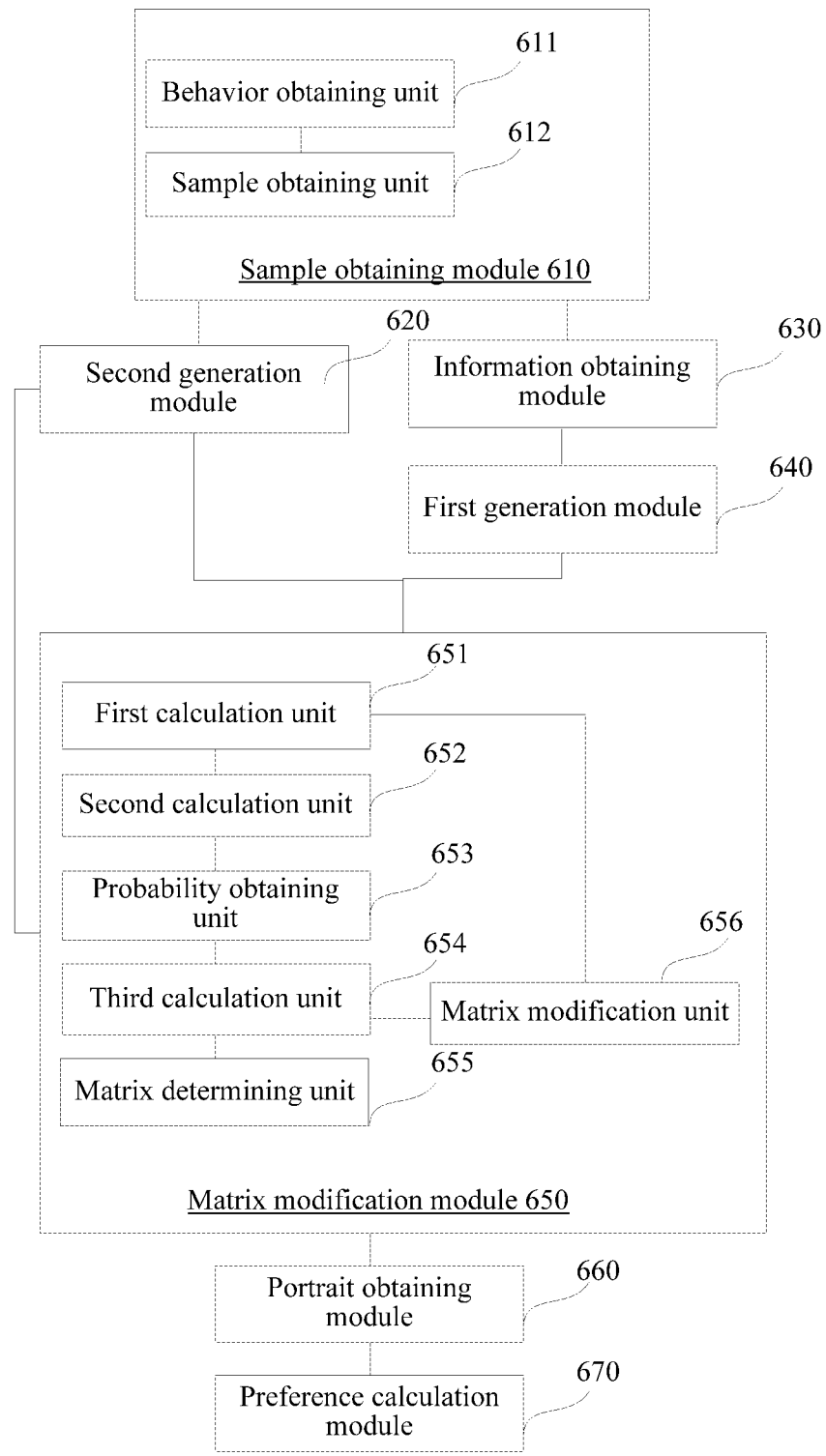
FIG. 6 is a structural block diagram of a user portrait obtaining apparatus according to another exemplary embodiment of the present disclosure.

FIG. 6 is a structural block diagram of a user portrait obtaining apparatus according to another exemplary embodiment of the present disclosure. The apparatus may be implemented by using software, hardware or a combination of the two to become a part or all of a server. The apparatus may include: a sample obtaining module 610, a matrix modification module 650, and a portrait obtaining module 660.

The sample obtaining module 610 is configured to obtain M training samples according to a user behavior log, a training sample <u, i, j> being used for reflecting a difference between preference degrees of a user u for an article i and an article j, and M being a positive integer.

In an exemplary implementation, the sample obtaining module 610 includes a behavior obtaining unit 611 and a sample obtaining unit 612.

The behavior obtaining unit 611 is configured to obtain a behavior type of each of m users for each of h articles according to the user behavior log, where h is an integer greater than 1.

The sample obtaining unit 612 is configured to obtain the M training samples according to the behavior type of each user for each article obtained by the behavior obtaining unit 611.

Optionally, the apparatus further includes a second generation module 620.

The second generation module 620 is configured to generate the initialized user parameter matrix $W_{m \times k}$ and the initialized tag parameter matrix $H_{k \times n}$, where elements in the initialized user parameter matrix $W_{m \times k}$ are normally distributed random numbers, and elements in the initialized tag parameter matrix $H_{k \times n}$ are normally distributed random numbers.

Optionally, the apparatus further includes an information obtaining module 630 and a first generation module 640.

The information obtaining module 630 is configured to obtain social network information of each of the m users.

The first generation module 640 is configured to generate a user similarity matrix $S_{m \times m}$ according to the social network information of the m users obtained by the information obtaining module 630.

The matrix modification module 650 is configured to modify, according to the training samples obtained by the sample obtaining module 610 and by using a data fitting model, an initialized user parameter matrix $W_{m \times k}$ and an initialized tag parameter matrix $H_{k \times n}$ that are generated by the second generation module 620, to obtain a final user parameter matrix $W_{m \times k}$ and a final tag parameter matrix $H_{k \times n}$, m representing the number of users, k representing the number of factors, n representing the number of tags, m being a positive integer, k being a positive integer, and n being an integer greater than 1.

In an exemplary implementation, the matrix modification module 650 includes: a first calculation unit 651, a second calculation unit 652, a probability obtaining unit 653, a third calculation unit 654, a matrix determining unit 655, and a matrix modification unit 656.

The first calculation unit 651 is configured to: let a=0, and calculate a preference degree of each of the m users for each of the n tags according to a user parameter matrix $W_{m \times k}$ obtained after an $a^{th}$ round of modification and a tag parameter matrix $H_{k \times n}$ obtained after the $a^{th}$ round of modification, where a is an integer greater than or equal to 0, a user parameter matrix $W_{m \times k}$ obtained after the $0^{th}$ round of modification is the initialized user parameter matrix $W_{m \times k}$, and a tag parameter matrix $H_{k \times n}$ obtained after the $0^{th}$ round of modification is the initialized tag parameter matrix $H_{k \times n}$.

The second calculation unit 652 is configured to calculate a preference degree of each of the m users for each of h articles according to the preference degree of each of the m users for each of then tags and an article tag matrix $A_{h \times n}$, where h represents the number of articles, and h is an integer greater than 1.

The probability obtaining unit 653 is configured to obtain, according to the preference degree of each of the m users for each of the h articles, a probability corresponding to each of the M training samples, where a probability corresponding to the training sample <u, i, j> is a probability that a preference degree of the user u for the article i is greater than a preference degree for the article j.

The third calculation unit 654 is configured to use the probabilities respectively corresponding to the M training samples as input parameters of the data fitting model, and calculate an output result of the data fitting model.

Optionally, the data fitting model is:

$$\sum_{(u,i,j) \in D_s} \left( \ln \sigma(\hat{x}_{uij}) - \frac{\lambda_W}{2} \|W_u\|^2 - \frac{\lambda_H}{2} \|H\|^2 - \frac{\lambda_S}{2} \left\| W_u - \sum_{v \in N_u} S_{uv} W_v \right\|^2 \right).$$

where $\lambda_W$, $\lambda_H$, and $\lambda_S$ are regularization parameters used for preventing over fitting, $\lambda_W$, $\lambda_H$, and $\lambda_S$ are positive real numbers, $\|\bullet\|$ represents a 2-norm of a matrix, $D_s$ represents a set of the M training samples, a probability corresponding to the training sample <u, i, j> is $$\sigma(\hat{x}_{uij}) = \frac{1}{1 + e^{-\hat{x}_{uij}}},$$

$\hat{x}_{uij}$ represents a difference between the preference degree of the user u for the article i and the preference degree of the user u for the article j, $\sigma(x)$ represents a logistic function, $N_u$ represents a set of associated users of the user u, $S_{uv}$ is an element in a $u^{th}$ row and a $v^{th}$ column in a user similarity matrix $S_{m \times m}$, $S_{uv}$ represents a similarity between the user u and a user v, $W_u$ represents a row vector corresponding to a $u^{th}$ row in the user parameter matrix $W_{m \times k}$ obtained after the $a^{th}$ round of modification, and $W_v$ represents a row vector corresponding to a $v^{th}$ row in the user parameter matrix $W_{m \times k}$ obtained after the $a^{th}$ round of modification.

The matrix determining unit 655 is configured to: when the output result satisfies a preset condition, respectively determine the user parameter matrix $W_{m \times k}$ obtained after the $a^{th}$ round of modification and the tag parameter matrix $H_{k \times n}$ obtained after the $a^{th}$ round of modification as the final user parameter matrix $W_{m \times k}$ and the final tag parameter matrix $H_{k \times n}$.

The matrix modification unit 656 is configured to: when the output result dissatisfies the preset condition, modify the user parameter matrix $W_{m \times k}$ obtained after the $a^{th}$ round of modification to obtain a user parameter matrix $W_{m \times k}$ obtained after an $(a+1)^{th}$ round of modification, modify the tag parameter matrix $H_{k \times n}$ obtained after the $a^{th}$ round of modification to obtain a tag parameter matrix $H_{k \times n}$ obtained after the $(a+1)^{th}$ round of modification, let a=a+1, and re-perform the steps from the step of calculating the preference degree of each of the m users for each of the n tags according to the user parameter matrix $W_{m \times k}$ obtained after the $a^{th}$ round of modification and the tag parameter matrix $H_{k \times n}$ obtained after the $a^{th}$ round of modification.

In an exemplary implementation, the matrix modification unit 656 is specifically configured to calculate, according to the following formula, the user parameter matrix $W_{m \times k}$ obtained after the $(a+1)^{th}$ round of modification:

$$W'_u = W_u + \alpha \left( \frac{e^{-\hat{x}_{uij}}}{1 + e^{-\hat{x}_{uij}}} \sum_{l=1}^{n} H_{\bullet l}^T (A_{il} - A_{jl}) - \lambda_W W_u - \right.$$

$$\left. \lambda_S \left( W_u - \sum_{v \in N_u} S_{uv} W_v \right) + \lambda_S \sum_{\{v | u \in N_v\}} S_{vu} \left( W_v - \sum_{w \in N_v} S_{vw} W_w \right) \right)$$

where $W_u'$ represents a row vector corresponding to a $u^{th}$ row in the user parameter matrix $W_{m \times k}$ obtained after the $(a+1)^{th}$ round of modification, $W_u$ represents the row vector corresponding to the $u^{th}$ row in the user parameter matrix $W_{m \times k}$ obtained after the $a^{th}$ round of modification, $H_{\bullet l}^T$ represents a transpose vector of a column vector corresponding to an $l^{th}$ column in the tag parameter matrix $H_{k \times n}$ obtained after the $a^{th}$ round of modification, l is an integer greater than or equal to 1 and less than or equal to n, $\alpha$ is learning efficiency, and $\alpha$ is a positive real number.

In an exemplary implementation, the matrix modification unit 656 is specifically configured to calculate, according to the following formula, the tag parameter matrix $H_{k \times n}$ obtained after the $(a+1)^{th}$ round of modification:

$$H'_f = H_f + \alpha \left( \frac{e^{-\hat{x}uij}}{1 + e^{-\hat{x}uij}} W_{uf}(A_i - A_j) - \lambda_H H_f \right),$$

where $H'_f$ represents a row vector corresponding to an $f^{th}$ row in the tag parameter matrix $H_{k \times n}$ obtained after the $(a+1)^{th}$ round of modification, $H_f$ represents a row vector corresponding to an $f^{th}$ row in the tag parameter matrix $H_{k \times n}$ obtained after the $a^{th}$ round of modification, f is an integer greater than or equal to 1 and less than or equal to k, a is learning efficiency, and a is a positive real number.

The portrait obtaining module 660 is configured to obtain a user portrait matrix $P_{m \times n}$ according to the final user parameter matrix $W_{m \times k}$ and the final tag parameter matrix $H_{k \times n}$ that are obtained by the matrix modification module 650, an element $P_{ut}$ in a $u^{th}$ row and a $t^{th}$ column in the user portrait matrix $P_{m \times n}$ representing a preference degree of the user u for a tag t, u being an integer greater than or equal to 1 and smaller than or equal to m, and t being an integer greater than or equal to 1 and smaller than or equal to n.

Optionally, the apparatus further includes a preference calculation module 670.

The preference calculation module 670 is configured to calculate a preference degree of the user u for a target article according to the user portrait matrix $P_{m \times n}$ obtained by the portrait obtaining module 660 and a tag of the target article.

In conclusion, by using the apparatus provided in this embodiment, M training samples are obtained according to a user behavior log. An initialized user parameter matrix $W_{m \times k}$ and an initialized tag parameter matrix $H_{k \times n}$ are modified according to the M training samples by using a data fitting model, to obtain a final user parameter matrix $W_{m \times k}$ and a final tag parameter matrix $H_{k \times n}$. Then, a user portrait matrix $P_{m \times n}$ is obtained according to the final user parameter matrix $W_{m \times k}$ and the final tag parameter matrix $H_{k \times n}$.

Therefore, the technical problems in a conventional method that the time and labor costs are high and the accuracy of the obtained user portrait is low are resolved. A user and a tag are parameterized, and a user parameter matrix and a tag parameter matrix are modified by using the data fitting model, so as to fit a training sample. Therefore, a corresponding tag weight does not need to be manually set for the tag. A user portrait is automatically obtained according to the user behavior log by using a data fitting method, thereby implementing the technical improvements of reducing the time and labor costs and accurately and highly-efficiently obtaining the user portrait.

In addition, the user parameter matrix and the tag parameter matrix are modified in a manner of machine learning, so as to fit the training samples, and further automatically obtain the user portrait more accurately and highly-efficiently.

In addition, based on the idea that "Birds of a feather gather together", preference of two users having a higher similarity is more similar. The user similarity matrix is added to the data fitting model to serve as a constraint condition instead of obtaining the user portrait only by relying on the user behavior log. Moreover, the user similarity matrix is considered during modification on the user parameter matrix. This reflects a strong correlation between a user parameter vector and a user parameter vector of an associated user, thereby more accurately obtaining the user portrait.

It should be noted that when the apparatus provided in the foregoing embodiment implements the functions thereof, it is illustrated with an example of division of the foregoing function modules. In actual application, the foregoing functions may be distributed to different function modules according to requirements, that is, the internal structure of the apparatus is divided into different function modules, so as to implement all or part of the functions described above. In addition, an inventive concept of the embodiments of the user portrait obtaining apparatus provided in the foregoing embodiments is the same as an inventive concept of the embodiments of the user portrait obtaining method. For a specific implementation process, refer to the method embodiments for details, and details are not described herein again.

Figure 7:
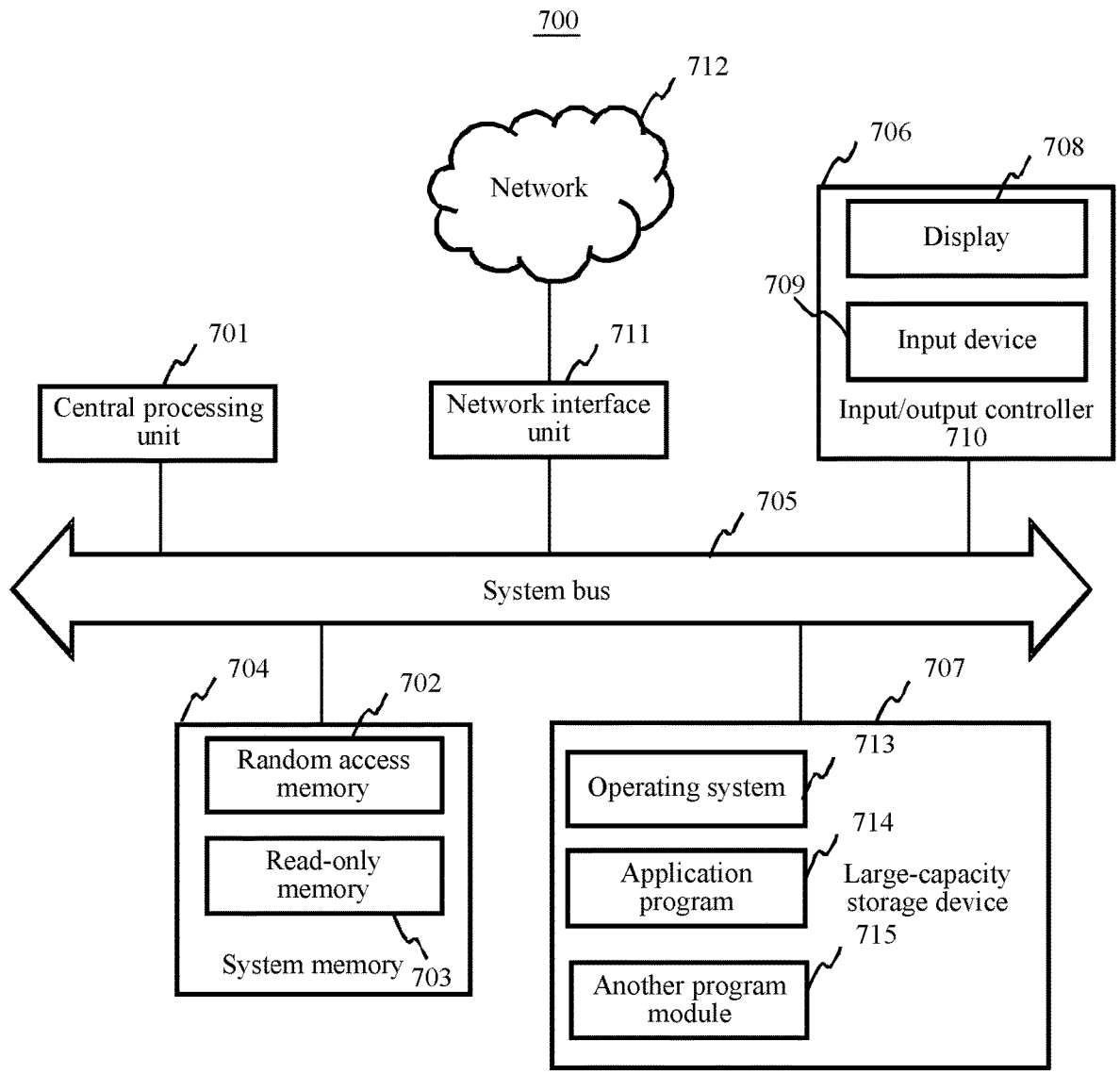
FIG. 7 is a schematic structural diagram of a server according to an exemplary embodiment of the present disclosure.

FIG. 7 is a schematic structural diagram of a server according to an exemplary embodiment of the present disclosure. The server is configured to implement the user portrait obtaining method provided according to various embodiments of the present disclosure.

The server 700 includes a central processing unit (CPU) 701, a system memory 704 including a random access memory (RAM) 702 and a read-only memory (ROM) 703, and a system bus 705 connecting the system memory 704 and the CPU 701. The server 700 further includes a basic input/output system (I/O system) 706 assisting in transmitting information between components in a computer, and a large-capacity storage device 707 configured to store an operating system 713, an application program 714, and another program module 715.

The basic I/O system 706 includes a display 708 configured to display information and an input device 709, such as a mouse or a keyboard, used by a user for inputting information. The display 708 and the input device 709 are both connected to the CPU 701 by using an input and output controller 710 connected to the system bus 705. The basic I/O system 706 may further include the input and output controller 710 to be configured to receive and process inputs from multiple other devices such as a keyboard, a mouse, and an electronic stylus. Similarly, the input and output controller 710 further provides an output to a display screen, a printer or another type of output device.

The large-capacity storage device 707 is connected to the CPU 701 by using a large-capacity storage controller (not shown) connected to the system bus 705. The large-capacity storage device 707 and its associated computer readable medium provide non-volatile storage for the server 700. That is, the large-capacity storage device 707 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as computer readable instructions, a data structure, a program module, or other data. The computer storage medium includes a RAM, a ROM, an EPROM, an EEPROM, a flash memory or other solid storage technologies; a CD-ROM, a DVD or other optical storages; and a cassette, a magnetic tape, a disk storage, or other magnetic storage devices. Certainly, a person skilled in art can learn that the computer storage medium is not limited to the foregoing several types. The system memory 704 and the large-capacity storage device 707 may be collectively referred to as a memory.

According to various embodiments of the present disclosure, the server 700 may further be connected, by using a network such as the Internet, to a remote computer on the network and run. That is, the server 700 may be connected to a network 712 by using a network interface unit 711 connected to the system bus 705, or may be to be connected to another type of network or remote computer system (not shown) by using the network interface unit 711.

The memory further includes one or more programs. The one or more programs are stored in the memory and configured to be executed by one or more processors. The one or more programs include instructions used for performing the foregoing method.

In an exemplary embodiment, a non-transitory computer readable storage medium including instructions is further provided, for example, a memory including instructions. The instructions may be executed by a processor of a server to implement the foregoing user portrait obtaining method. For example, the non-transitory computer readable storage medium may be a ROM, a random access memory (RAM), a CD-ROM, a magnetic tape, a floppy disk, or an optical data storage device.

It should be understood that "multiple" mentioned in this specification means two or more than two. "And/or" is used for describing an association relationship between associated objects, and represents that there may be three types of relationships. For example, A and/or B may represent: only A exists, both A and B exist, and only B exists. The symbol "/" represents that associated objects has an "or" relationship.

The sequence numbers of the foregoing embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

Beneficial effects of the technical solutions provided in the embodiments of the present disclosure include the following.

M training samples are obtained according to a user behavior log. An initialized user parameter matrix $W_{m \times k}$ and an initialized tag parameter matrix $H_{k \times n}$ are modified according to the M training samples by using a data fitting model, to obtain a final user parameter matrix $W_{m \times k}$ and a final tag parameter matrix $H_{k \times n}$. Then, a user portrait matrix $P_{m \times n}$ is obtained according to the final user parameter matrix $W_{m \times k}$ and the final tag parameter matrix $H_{k \times n}$.

Therefore, the technical problems in a conventional method that the time and labor costs are high and the accuracy of the obtained user portrait is low are resolved. A user and a tag are parameterized, and a user parameter matrix and a tag parameter matrix are modified by using the data fitting model, so as to fit a training sample. Therefore, a corresponding tag weight does not need to be manually set for the tag. A user portrait is automatically obtained according to the user behavior log by using a data fitting method, thereby implementing the technical improvements of reducing the time and labor costs and accurately and highly-efficiently obtaining the user portrait.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A user portrait obtaining method, comprising:
recording behaviors of m users on articles, the behaviors performed by the m users on the articles including browsing, purchasing, adding to favorites, deleting, using, reposting, liking, disliking, or commenting, wherein the articles are each a physical object for work or life consumption;
generating a user behavior log of the m users on the articles according to the behaviors recorded of the m users on the articles;
obtaining M training samples according to the user behavior log, wherein the m users include a user u, the articles include an article i and an article j, the articles are represented by tags, and each of the tags includes a keyword describing an article feature, and wherein a training sample <u, i, j> of the M training samples reflects a preference degree of the user u for the article i different than a preference degree of the user u for the article j, and M being a positive integer, wherein obtaining the M training samples includes:
obtaining a user article matrix according to the user behavior log, wherein the user article matrix is represented by $R_{m \times h}$, with rows representing the m users and columns representing h articles, m being greater than or equal to 3, h being greater than or equal to 4, and an element $R_{ui}$ representing whether the user u has performed behavior on the article i; and
obtaining the M training samples according to the user article matrix;
modifying an initialized user parameter matrix $W_{m \times k}$ and an initialized tag parameter matrix $H_{k \times n}$ according to the M training samples, to obtain a final user parameter matrix $W_{m \times k}$ and a final tag parameter matrix $H_{k \times n}$, m representing number of the users, k representing number of factors, n representing number of the tags, m being a positive integer, k being a positive integer, and n being an integer greater than 1;
obtaining a user portrait matrix $P_{m \times n}$ according to the final user parameter matrix $W_{m \times k}$ and the final tag parameter matrix $H_{k \times n}$, an element $P_{ut}$ in a $u^{th}$ row and a $t^{th}$ column in the user portrait matrix $P_{m \times n}$ representing a preference degree of the user u for a tag t, u being an integer greater than or equal to 1 and smaller than or equal to m, and t being an integer greater than or equal to 1 and smaller than or equal to n;
identifying m−1 association users each in a social relationship with the user u, the m−1 association users and the user u together forming the m users, and generating a user similarity matrix $S_{m \times m}$ reflecting similarity between every two users of the m users, wherein the user similarity matrix $S_{m \times m}$ includes $S_{uv}$ representing a similarity between the user u and a user v, the user v is one of the m−1 association users, and normalization is performed on the $S_{uv}$ such that $$\sum_{v=1}^{m} S_{uv} = 1,$$

and wherein the similarity includes a correlation on communication frequency between the user u and the user v;

calculating a preference degree of the user u for a target article according to the user portrait matrix $P_{m \times n}$ and tags of the target article and the user similarity matrix $S_{m \times m}$; and sending personalized recommendation to the user u of the target article according to the preference degree.

2. The user portrait obtaining method according to claim 1, wherein the modifying an initialized user parameter matrix $W_{m \times k}$ and an initialized tag parameter matrix $H_{k \times n}$ according to the M training samples, to obtain a final user parameter matrix $W_{m \times k}$ and a final tag parameter matrix $H_{k \times n}$ comprises:

letting a=0, and calculating a preference degree of each of the m users for each of the n tags according to a user parameter matrix $W_{m \times k}$ obtained after an $a^{th}$ round of modification and a tag parameter matrix $H_{k \times n}$ obtained after the $a^{th}$ round of modification, wherein a is an integer greater than or equal to 0, a user parameter matrix $W_{m \times k}$ obtained after the $0^{th}$ round of modification is the initialized user parameter matrix $W_{m \times k}$, and a tag parameter matrix $H_{k \times n}$ obtained after the $0^{th}$ round of modification is the initialized tag parameter matrix $H_{k \times n}$;

calculating a preference degree of each of the m users for each of h articles according to the preference degree of each of the m users for each of the n tags and an article tag matrix $A_{h \times n}$, wherein h represents the number of articles, and h is an integer greater than 1;

obtaining, according to the preference degree of each of the m users for each of the h articles, a probability corresponding to each of the M training samples, wherein a probability corresponding to the training sample <u, i, j> is a probability that a preference degree of the user u for the article i is greater than a preference degree for the article j;

using the probabilities respectively corresponding to the M training samples as input parameters of a data fitting model, and calculating an output result of the data fitting model;

when the output result satisfies a preset condition, determining the user parameter matrix $W_{m \times k}$ obtained after the $a^{th}$ round of modification and the tag parameter matrix $H_{k \times n}$ obtained after the $a^{th}$ round of modification as the final user parameter matrix $W_{m \times k}$ and the final tag parameter matrix $H_{k \times n}$, respectively; and when the output result dissatisfies the preset condition, modifying the user parameter matrix $W_{m \times k}$ obtained after the $a^{th}$ round of modification to obtain a user parameter matrix $W_{m \times k}$ obtained after an $(a+1)^{th}$ round of modification, modifying the tag parameter matrix $H_{k \times n}$ obtained after the $a^{th}$ round of modification to obtain a tag parameter matrix $H_{k \times n}$ obtained after the $(a+1)^{th}$ round of modification, letting a=a+1, and re-performing the steps from the step of calculating the preference degree of each of the m users for each of the n tags according to the user parameter matrix $W_{m \times k}$ obtained after the $a^{th}$ round of modification and the tag parameter matrix $H_{k \times n}$ obtained after the $a^{th}$ round of modification.

3. The user portrait obtaining method according to claim 1, further comprising:

obtaining social network information of each of the m users;

generating the user similarity matrix $S_{m \times m}$ according to the social network information of the m users; and establishing a data fitting model according to the user similarity matrix $S_{m \times m}$.

4. The user portrait obtaining method according to claim 1, wherein elements in the initialized user parameter matrix $W_{m \times k}$ are normally distributed random numbers, and elements in the initialized tag parameter matrix $H_{k \times n}$ are normally distributed random numbers.

5. The user portrait obtaining method according to claim 1, wherein h represents number of the articles, and M is m×h×(h−1)/2.

6. The user portrait obtaining method according to claim 1, wherein the element $R_{ui}$ in the user article matrix $R_{m \times h}$ is either 0 or 1, with 0 representing the user u has not performed any behavior on the article i and 1 representing the user u has performed some behavior on the article i.

7. The user portrait obtaining method according to claim 1, wherein the user u is user 3 and the article i is article 4, the user article matrix $R_{m \times h}$ includes user 1, user 2, the user 3, article 1, article 2, article 3, and the article 4, training samples of the user 1 include <1, 2, 1>, <1, 2, 3>, and <1, 2, 4>, the training sample <1, 2, 1> represents the user 1 has a greater preference for the article 2 than the article 1, the training sample <1, 2, 3> represents the user 1 has a greater preference for the article 2 than the article 3, and the training sample <1, 2, 4> represents the user 1 has a greater preference for the article 2 than the article 4.

8. The user portrait obtaining method according to claim 1, wherein the user similarity matrix $S_{m \times m}$ is generated by:

listing the m users respectively in m columns of the user similarity matrix $S_{m \times m}$;

listing the m users respectively in m rows of the user similarity matrix $S_{m \times m}$; and setting a diagonal element Suu of the user similarity matrix to 0, the diagonal element Suu representing a similarity of the user u and the user u himself or herself.

9. The user portrait obtaining method according to claim 1, wherein the user similarity matrix $S_{m \times m}$ is generated by:

setting each similarity value of the user similarity matrix $S_{m \times m}$ to be smaller than 1.

10. A user portrait obtaining apparatus, comprising: a memory, configured to store computer-readable instructions; and one or more processors, coupled to the memory and when the computer-readable instructions being executed, configured to:

record behaviors of m users on articles, the behaviors performed by the m users on the articles including browsing, purchasing, adding to favorites, deleting, using, reposting, liking, disliking, or commenting, wherein the articles are each a physical object for work or life consumption;

generate a user behavior log of the m users on the articles according to the behaviors recorded of the m users on the articles;

obtain M training samples according to the user behavior log, wherein the m users include a user u, the articles include an article i and an article j, the articles are represented by tags, and each of the tags includes a keyword describing an article feature, and wherein a training sample <u, i, j> of the M training samples reflects a preference degree of the user u for the article i different than a preference degree of the user u for the article j, and M being a positive integer, wherein to obtain the M training samples includes:

obtaining a user article matrix according to the user behavior log, wherein the user article matrix is represented by $R_{m \times h}$, with rows representing the m users and columns representing h articles, m being greater than or equal to 3, h being greater than or equal to 4, and an element $R_{ui}$ representing whether the user u has performed behavior on the article i; and obtaining the M training samples according to the user article matrix;

modify an initialized user parameter matrix $W_{m\times k}$ and an initialized tag parameter matrix $H_{k\times n}$ according to the M training samples, to obtain a final user parameter matrix $W_{m\times k}$ and a final tag parameter matrix $H_{k\times n}$, m representing number of the users, k representing number of factors, n representing number of the tags, m being a positive integer, k being a positive integer, and n being an integer greater than 1;

obtain a user portrait matrix $P_{m\times n}$ according to the final user parameter matrix $W_{m\times k}$ and the final tag parameter matrix $H_{k\times n}$, an element $P_{ut}$ in a $u^{th}$ row and a $t^{th}$ column in the user portrait matrix $P_{m\times n}$ representing a preference degree of the user u for a tag t, u being an integer greater than or equal to 1 and smaller than or equal to m, and t being an integer greater than or equal to 1 and smaller than or equal to n;

identify m−1 association users each in a social relationship with the user u, the m−1 association users and the user u together forming the m users, and generate a user similarity matrix $S_{m\times m}$ reflecting similarity between every two users of the m users, wherein the user similarity matrix $S_{m\times m}$ includes $S_{uv}$ representing a similarity between the user u and a user v, the user v is one of the m−1 association users, and normalization is performed on the $S_{uv}$ such that $$\sum_{v=1}^{m} S_{uv} = 1,$$

and wherein the similarity includes a correlation on communication frequency between the user u and the user v;

calculate a preference degree of the user u for a target article according to the user portrait matrix $P_{m\times n}$ and tags of the target article and the user similarity matrix $S_{m\times m}$; and send personalized recommendation to the user u of the target article according to the preference degree.

11. The user portrait obtaining apparatus according to claim 10, wherein the one or more processors are further configured to:

let a=0, and calculate a preference degree of each of the m users for each of the n tags according to a user parameter matrix $W_{m\times k}$ obtained after an $a^{th}$ round of modification and a tag parameter matrix $H_{k\times n}$ obtained after the $a^{th}$ round of modification, wherein a is an integer greater than or equal to 0, a user parameter matrix $W_{m\times k}$ obtained after the $0^{th}$ round of modification is the initialized user parameter matrix $W_{m\times k}$, and a tag parameter matrix $H_{k\times n}$ obtained after the $0^{th}$ round of modification is the initialized tag parameter matrix $H_{k\times n}$;

calculate a preference degree of each of the m users for each of h articles according to the preference degree of each of the m users for each of the n tags and an article tag matrix $A_{h\times n}$, wherein h represents the number of articles, and h is an integer greater than 1;

obtain, according to the preference degree of each of the m users for each of the h articles, a probability corresponding to each of the M training samples, wherein a probability corresponding to the training sample <u, i, j> is a probability that a preference degree of the user u for the article i is greater than a preference degree for the article j;

use the probabilities respectively corresponding to the M training samples as input parameters of a data fitting model, and calculate an output result of the data fitting model;

when the output result satisfies a preset condition, determine the user parameter matrix $W_{m\times k}$ obtained after the $a^{th}$ round of modification and the tag parameter matrix $H_{k\times n}$ obtained after the $a^{th}$ round of modification as the final user parameter matrix $W_{m\times k}$ and the final tag parameter matrix $H_{k\times n}$, respectively; and when the output result dissatisfies the preset condition, modify the user parameter matrix $W_{m\times k}$ obtained after the $a^{th}$ round of modification to obtain a user parameter matrix $W_{m\times k}$ obtained after an $(a+1)^{th}$ round of modification, modify the tag parameter matrix $H_{k\times n}$ obtained after the $a^{th}$ round of modification to obtain a tag parameter matrix $H_{k\times n}$ obtained after the $(a+1)^{th}$ round of modification, let a=a+1, and re-perform the steps from the step of calculating the preference degree of each of the m users for each of the n tags according to the user parameter matrix $W_{m\times k}$ obtained after the $a^{th}$ round of modification and the tag parameter matrix $H_{k\times n}$ obtained after the $a^{th}$ round of modification.

12. The user portrait obtaining apparatus according to claim 10, wherein the one or more processors are further configured to:

obtain social network information of each of the m users;

generate the user similarity matrix $S_{m\times m}$ according to the social network information of the m users; and establish a data fitting model according to the user similarity matrix $S_{m\times m}$.

13. The user portrait obtaining apparatus according to claim 10, wherein elements in the initialized user parameter matrix $W_{m\times k}$ are normally distributed random numbers, and elements in the initialized tag parameter matrix $H_{k\times n}$ are normally distributed random numbers.

14. The user portrait obtaining apparatus according to claim 10, wherein the one or more processors are further configured to:

calculate a preference degree of the user u for a target article according to the user portrait matrix $P_{m\times n}$ and tags of the target article.

15. The user portrait obtaining apparatus according to claim 10, wherein h represents number of the articles, and M is m×h×(h−1)/2.

16. A non-transitory computer-readable storage medium containing computer-executable program instructions for one or more processors to:

record behaviors of m users on articles, the behaviors performed by the m users on the articles including browsing, purchasing, adding to favorites, deleting, using, reposting, liking, disliking, or commenting, wherein the articles are each a physical object for work or life consumption;

generate a user behavior log of the m users on the articles according to the behaviors recorded of the m users on the articles;

obtain M training samples according to the user behavior log, wherein the m users include a user u, and the articles include an article i and an article j, the articles are represented by tags, and each of the tags includes a keyword describing an article feature, and wherein a training sample <u, i, j> of the M training samples reflects a preference degree of the user u for the article i different than a preference degree of the user u for the article j, and M being a positive integer, wherein to obtain the M training samples includes:
  obtaining a user article matrix according to the user behavior log, wherein the user article matrix is represented by $R_{m \times h}$, with rows representing the m users and columns representing h articles, m being greater than or equal to 3, h being greater than or equal to 4, and an element $R_{ui}$ representing whether the user u has performed behavior on the article i; and
  obtaining the M training samples according to the user article matrix;
modify an initialized user parameter matrix $W_{m \times k}$ and an initialized tag parameter matrix $H_{k \times n}$ according to the M training samples, to obtain a final user parameter matrix $W_{m \times k}$ and a final tag parameter matrix $H_{k \times n}$, m representing number of the users, k representing number of factors, n representing number of the tags, m being a positive integer, k being a positive integer, and n being an integer greater than 1; and
obtain a user portrait matrix $P_{m \times n}$ according to the final user parameter matrix $W_{m \times k}$ and the final tag parameter matrix $H_{k \times n}$, an element $P_{ut}$ in a $u^{th}$ row and a $t^{th}$ column in the user portrait matrix $P_{m \times n}$ representing a preference degree of the user u for a tag t, u being an integer greater than or equal to 1 and smaller than or equal to m, and t being an integer greater than or equal to 1 and smaller than or equal to n;
identify m−1 association users each in a social relationship with the user u, the m−1 association users and the user u together forming the m users, and generate a user similarity matrix $S_{m \times m}$ reflecting similarity between every two users of the m users, wherein the user similarity matrix $S_{m \times m}$ includes $S_{uv}$ representing a similarity between the user u and a user v, the user v is one of the m−1 association users, and normalization is performed on the $S_{uv}$ such that $$\sum_{v=1}^{m} S_{uv} = 1,$$

and wherein the similarity includes a correlation on communication frequency between the user u and the user v;
calculate a preference degree of the user u for a target article according to the user portrait matrix $P_{m \times n}$ and tags of the target article and the user similarity matrix $S_{m \times m}$; and
send personalized recommendation to the user u of the target article according to the preference degree.

17. The non-transitory computer-readable storage medium according to claim 16, wherein the one or more processors are further configured to:
  let a=0, and calculate a preference degree of each of the m users for each of the n tags according to a user parameter matrix $W_{m \times k}$ obtained after an $a^{th}$ round of modification and a tag parameter matrix $H_{k \times n}$ obtained after the $a^{th}$ round of modification, wherein a is an integer greater than or equal to 0, a user parameter matrix $W_{m \times k}$ obtained after the $0^{th}$ round of modification is the initialized user parameter matrix $W_{m \times k}$, and a tag parameter matrix $H_{k \times n}$ obtained after the $0^{th}$ round of modification is the initialized tag parameter matrix $H_{k \times n}$;
  calculate a preference degree of each of the m users for each of h articles according to the preference degree of each of the m users for each of the n tags and an article tag matrix $A_{h \times n}$, wherein h represents the number of articles, and h is an integer greater than 1;
  obtain, according to the preference degree of each of the m users for each of the h articles, a probability corresponding to each of the M training samples, wherein a probability corresponding to the training sample <u, i, j> is a probability that a preference degree of the user u for the article i is greater than a preference degree for the article j;
  use the probabilities respectively corresponding to the M training samples as input parameters of a data fitting model, and calculate an output result of the data fitting model;
  when the output result satisfies a preset condition, determine the user parameter matrix $W_{m \times k}$ obtained after the $a^{th}$ round of modification and the tag parameter matrix $H_{k \times n}$ obtained after the $a^{th}$ round of modification as the final user parameter matrix $W_{m \times k}$ and the final tag parameter matrix $H_{k \times n}$, respectively; and
  when the output result dissatisfies the preset condition, modify the user parameter matrix $W_{m \times k}$ obtained after the $a^{th}$ round of modification to obtain a user parameter matrix $W_{m \times k}$ obtained after an $(a+1)^{th}$ round of modification, modify the tag parameter matrix $H_{k \times n}$ obtained after the $a^{th}$ round of modification to obtain a tag parameter matrix $H_{k \times n}$ obtained after the $(a+1)^{th}$ round of modification, let a=a+1, and re-perform the steps from the step of calculating the preference degree of each of the m users for each of the n tags according to the user parameter matrix $W_{m \times k}$ obtained after the $a^{th}$ round of modification and the tag parameter matrix $H_{k \times n}$ obtained after the $a^{th}$ round of modification.

18. The non-transitory computer-readable storage medium according to claim 16, wherein h represents number of the articles, and M is m×h×(h−1)/2.

* * * * *